US006245145B1

(12) United States Patent
Lisec

(10) Patent No.: US 6,245,145 B1
(45) Date of Patent: Jun. 12, 2001

(54) DEVICE FOR COATING OF SPACER FRAMES FOR INSULATED GLASS PANES

(76) Inventor: Peter Lisec, Bahnhofstr. 34, A-3363 Amstetten-Hausmening (AT)

( * ) Notice: Subject to any disclaimer, the term of this patent is extended or adjusted under 35 U.S.C. 154(b) by 0 days.

(21) Appl. No.: 09/141,746

(22) Filed: Aug. 28, 1998

(30) Foreign Application Priority Data

Sep. 12, 1997 (AT) .................................................. 1540/97

(51) Int. Cl.[7] ............................. B05C 5/02; B05C 11/02; C03C 27/10; B65G 13/00; B65G 21/20

(52) U.S. Cl. ......................... 118/300; 118/108; 118/109; 156/109; 427/208.2; 193/35 C; 193/35 TE; 193/37; 198/817; 198/836.2

(58) Field of Search ................................... 118/303, 306, 118/307, 44, 71, 108, 669, 300; 193/35 C, 37, 35 TE; 198/817, 836.1, 836.2; 156/109; 427/208.2

(56) References Cited

U.S. PATENT DOCUMENTS 4,546,723 * 10/1985 Leopold et al. .................... 118/669
4,949,666 8/1990 Lisec .
5,295,292 * 3/1994 Leopold ................................ 29/417
5,695,186 * 12/1997 Phillips et al. ...................... 271/252

FOREIGN PATENT DOCUMENTS 0 585 534 3/1994 (EP) .

* cited by examiner

*Primary Examiner*—Richard Crispino
*Assistant Examiner*—J. A. Lorengo
(74) *Attorney, Agent, or Firm*—Young & Thompson

(57) ABSTRACT

In a device for coating of spacer frames (2) for insulated glass panes, there are nozzles on either side of conveyor (1) from which adhesive or sealant is applied to side surfaces (4) of spacer frame (2). Above conveyor (1) there are pressure rollers (10) which press spacer frame (2) against conveyor belt (1) Pressure rollers (10) engage spacer frame (2) in the area of the side edges of inside surface (6) of hollow section (5) which is forming. In this way a frictional connection between conveyor belt (1) and spacer frame (2) is effected and the leg of spacer frame (2) which lies on conveyor belt (1) is guided laterally. Pressure rollers (10) need not be swivelled up when staves (10) move past pressure rollers (10) when spacer frame (2) provided with staves (15) is being coated.

5 Claims, 1 Drawing Sheet

Fig.2
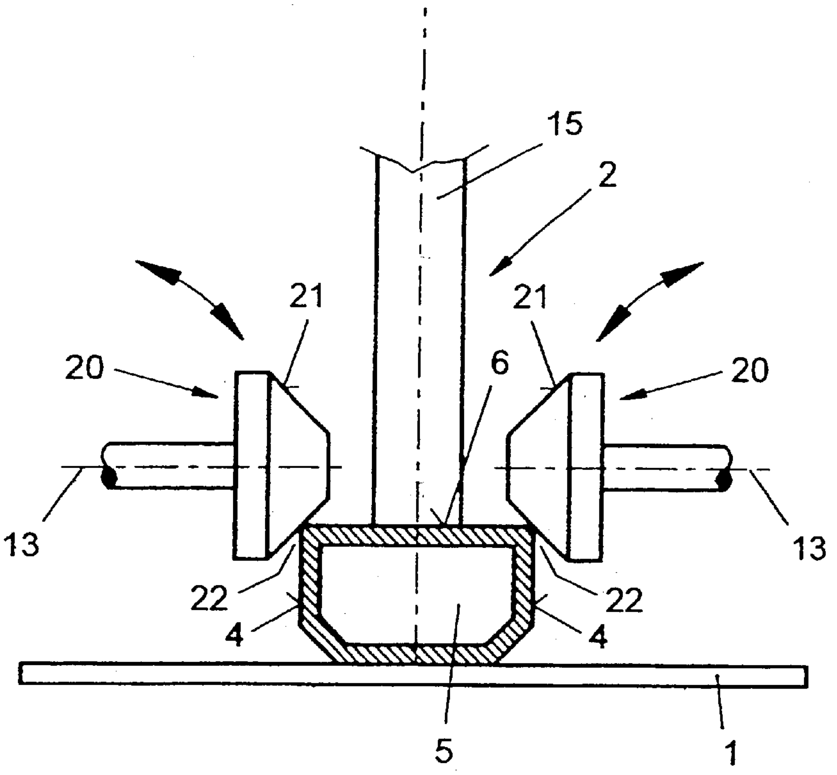
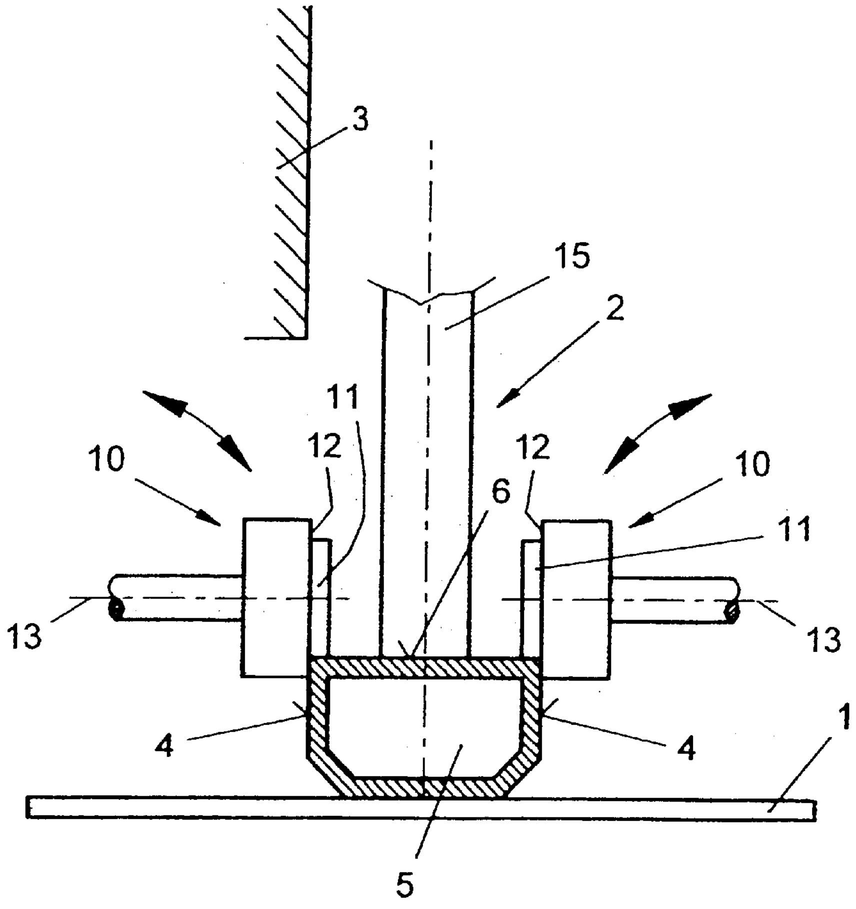
Fig.1

DEVICE FOR COATING OF SPACER FRAMES FOR INSULATED GLASS PANES

FIELD OF THE INVENTION

The invention relates to a device for coating of spacer frames for insulated glass panes with adhesive and sealant with the features of the introductory part of independent claim 1.

BACKGROUND OF THE INVENTION

Devices for coating of spacer frames for insulated glass with adhesive and sealant are known. See, for example, U.S. Pat. No. 4,949,666 A.

All known devices for coating of spacer frames have two or more pressure rollers which press the section of the spacer frame which has passed between the nozzles from which the sealant and adhesive is applied to the side walls of the spacer frame for insulating glass panes, against the transport belt of the conveyor. The pressure rollers in the known devices abut the inside wall of the hollow section strip which forms the spacer frame. This means that the pressure rollers need not only be swivelled away when the legs of the spacer frame which project upwards from the conveyor move past the pressure rollers during the coating process, but that they must also be swivelled away when spacer frames with staves are being coated with sealant or adhesive. In addition, the pressure rollers of the known devices do not cause any lateral guidance, i.e. no guidance transversely to the plane of the spacer frame so that in the known devices, viewed in the direction of motion of the spacer frame, in front of the nozzles there are guide elements, for example, in the form of rollers, to guide the spacer frame exactly between the nozzles.

SUMMARY OF THE INVENTION

The object of the invention is to improve the known devices such that the drive rollers not only cause the necessary frictional connection between the conveyor belt of the conveyor and the spacer frame, but also guide the spacer frame laterally, and that they need not always be swivelled up when a stave moves past the pressure roller while a spacer frame is being coated.

Because as claimed in the invention the pressure rollers engage the spacer frame leg which moves through between the coating nozzles and which lies on the conveyor only in the area of the side edges of the inside surface of the spacer frame, they need only be swivelled up more when the legs of the spacer frame which project upward from the conveyor move past the pressure rolls, while the spacer frame is being coated. When staves located within the spacer frame move past the pressure rollers, the latter can continue to engage the leg which lies on the conveyor. In this way the control effort is greatly simplified and devices which grip the staves and trigger swivelling of the pressure rollers upwards become unnecessary.

If according to one version of the invention it is provided that two pressure rollers at a time are located opposite one another, this yields especially reliable guidance of the leg of the spacer frame lying on the conveyor.

In one embodiment of the invention it can be provided that the pressure rollers are staggered rollers, with the part with a smaller diameter in the area of the outside edge of the inside surface and with the annular surface aligned perpendicularly to the axis of rotation abutting the side surfaces of the hollow section strip. This embodiment has the advantage that the pressure rollers engage solely in the area of the upper longitudinal edges of the spacer frame leg lying on the conveyor and still secure guidance is accomplished. Here it can be provided that the annular surfaces touch the side surfaces of the hollow section strip only in its area adjacent to the inside surface. This yields the advantage that an adhesive or sealant applied to the side surfaces of the hollow section strips is not touched by the pressure rollers.

In one alternative embodiment of the invention it can be provided that the pressure rollers are conical rollers with cone surfaces which adjoin the side edges of the inside surface of the hollow section strip which forms the spacer frame. This embodiment has the advantage that the pressure rollers need be adjustable in only one direction for matching to the different section dimensions.

Here it is preferred that the pressure rollers are held adjustably in the direction of their axes; this allows a simple construction.

In certain cases, as claimed in the invention it can be additionally provided that the distance of the pressure rollers from the conveyor belt of the conveyor can be changed. This embodiment makes it possible to match the pressure rollers, even if they are staggered rollers, to all possible section cross-sectional shapes which occur in practice.

BRIEF DESCRIPTION OF THE DRAWINGS

Other details and features and advantages of the device for coating of spacer frames as claimed in the invention derive from the following description of the embodiments shown in the drawings. FIG. 1 shows in schematic form, viewed in the conveyor direction, a first embodiment of the pressure rollers, and FIG. 2 shows one altered embodiment.

DESCRIPTION OF THE PREFERRED EMBODIMENTS

Devices for coating of spacer frames with adhesive and sealant which can be made as shown and described in the initially mentioned publications have a conveyor usually with conveyor belt 1 for spacer frames 2 to be coated, above the conveyor support means 3 for the parts of spacer frames 2 which project upwards from the conveyor, nozzles located on either side of the conveyor, from which the adhesive or sealant is applied to side surfaces 4 of hollow section strip 5 which forms the spacer frame 2, optionally devices ("turning grippers") for turning spacer frames 2 after one leg thereof has been coated, and pressure rollers which cause a frictional connection between conveyor belt 1 of the conveyor and spacer frame 2. The transport of the spacer frames can be supported, especially during coating, by an entrainment means which engages one spacer frame leg which projects upward from the conveyor.

Side support device 3, as shown and described in the aforementioned publications, can consist of a series of support rollers which support transport of the spacer frames in the coating process, for which the support rollers are driven. In the process of turning which can be executed for example in the "turning grippers" shown and described in the aforementioned publications, the support rollers can be swivelled out of the conveyor plane or they are simply reversed so that no shearing forces which damage this coating act on the freshly applied coating. Side support 3 of the parts of spacer frame 2 which project upward from the conveyor can also be made in the form of a (sliding) wall in which there is optionally a conveyor belt which, when the spacer frame turns, can be withdrawn to behind the support wall. To do this the support belt is located in a slot of the side support wall. It should however be pointed out that the formation of side support 3 is not important to the invention.

In the device as claimed in the invention, instead of the pressure rollers which in the known devices adjoin entire inside surface 6 of hollow section strips 5 which form spacer frames 2, there are pressure rollers 10 shown in the drawings.

Pressure rollers 10 in the embodiment shown in FIG. 1 are opposing staggered rollers, therefore paired, which with their smaller diameter section 11 adjoin the side edge of inside surface 6 of spacer frame 2 and press it against conveyor belt 1 of the conveyor. With annular surfaces 12 which are aligned perpendicularly to the axis of rotation pressure rollers 10 adjoin the upper ends of side surfaces 4 of hollow section strip 5 of spacer frame 2. In this way lateral guidance of the legs of spacer frame 2 which lie on conveyor belt 1 is achieved. FIG. 1 also shows that pressure rollers 10 need not be swivelled away when in the coating process stave 15 moves between pressure rollers 10. Only at the start and the end of a coating process of one leg of spacer frame 2 are pressure rollers 10 swivelled up so that the leg of spacer frame 2 which projects upward from the conveyor can pass pressure rollers 10 unhindered. Depending on requirements, in the device as claimed in the invention there is at least one pair of pressure rollers 10. Preferably there are two pairs of pressure rollers 10, i.e. one pair before and one pair following the nozzles with which the sealant and adhesive are applied to side surfaces 4 of the spacer frames.

Optionally driven pressure rollers 10 are supported such that they can be matched to different dimensions of hollow section strips 5. To do this, pressure rollers 10 can be adjusted in the direction of their axes 13 so that they can be matched to different spacer widths. In addition, pressure rollers 10 can be adjusted perpendicular to their axes 13 so that they can be matched to different heights (dimensions of hollow section strip 5 measured in the direction of the plane of spacer frame 2). Changing the adjustability of pressure rollers 10 transversely to their axes of rotation 13, therefore adjustability by their distance from conveyor belt 1, can also be used to place the pressure rollers with the pressure required at the time against hollow section strip 5.

In the embodiment shown in FIG. 2, pressure rollers 20 are made as conical rollers with conical surfaces 21 which adjoin inside surface 6 of spacer frame 2 only in the area of outside edges 22. In this embodiment the necessary contact pressure of spacer frame 2 against conveyor belt 1 and lateral guidance of the leg of spacer frame 2 which rests on conveyor belt 1 are achieved.

In summary, one embodiment of the invention can be described as follows.

In a device for coating of spacer frames 2 for insulating glass panes, on either side of conveyor 1 there are nozzles from which adhesive or sealant is applied to side surfaces 4 of spacer frame 2. Above conveyor belt 1 there are pressure rollers 10 which press spacer frame 2 against conveyor belt 1. Pressure rollers 10 engage spacer frame 2 in the area of the side edges of inside surface 6 of hollow section 5 which is forming. In this way a frictional connection between conveyor belt 1 and spacer frame 2 is effected and the leg of spacer frame 2 which lies on conveyor belt 1 is guided laterally. Pressure rollers 10 need not be swivelled up when staves 5 move past pressure rollers 10 when spacer frame 2 provided with staves 15 is being coated.

What is claimed is:

1. Apparatus for coating a spacer frame for insulated glass panes with adhesive or sealant, the apparatus comprising:

a conveyor for conveying the spacer frame along a conveying path;

nozzles arranged on either side of the conveyor path for applying adhesive or sealant to lateral faces of the spacer frame;

a support positioned above the conveyor for supporting parts of the spacer frame which project upwards from the conveyor;

said spacer frame having a lower leg comprising a hollow section strip having a lower surface adapted to lie on the conveyor, two side surfaces, and an upper surface with side edges;

pressure rollers arranged to press the leg of the spacer frame against said conveyor; said pressure rollers adapted to swivel into contact with the leg and away from said leg;

said pressure rollers structured and arranged to abut only the side edges of the upper surface of the hollow section strip; and wherein the pressure rollers are staggered rollers having an axis of rotation, said rollers having a part of reduced diameter in the vicinity of the edges of the upper surface, and an annular surface, aligned perpendicularly to the axis of rotation, which abuts the side surfaces of the hollow section strip.

2. Apparatus according to claim 1, wherein at least two pressure rollers are positioned opposite one another on either side of the spacer frame.

3. Apparatus according to claim 1, wherein the annular surfaces touch the side surfaces of the hollow section strip only in an area adjacent to the upper surface.

4. Apparatus according to claim 1, further comprising means for adjusting the position of the pressure rollers in the direction of their axis of rotation.

5. Apparatus according to claim 1, further comprising means for adjusting the distance of the pressure rollers towards and away from the conveyor.

* * * * *